United States Patent
Malik et al.

(10) Patent No.: US 7,155,608 B1
(45) Date of Patent: Dec. 26, 2006

(54) FOREIGN NETWORK SPAM BLOCKER

(75) Inventors: Dale Malik, Atlanta, GA (US); Theodore Verren, Decatur, GA (US); William Conner, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 826 days.

(21) Appl. No.: 10/005,641

(22) Filed: Dec. 5, 2001

(51) Int. Cl.
    *H04L 9/00* (2006.01)
(52) U.S. Cl. ......................... 713/170; 713/168
(58) Field of Classification Search ................ 713/201; 709/227
    See application file for complete search history.

(56) References Cited

U.S. PATENT DOCUMENTS

| | | | |
|---|---|---|---|
| 6,052,709 | A | 4/2000 | Paul |
| 6,249,805 | B1 | 6/2001 | Fleming, III |
| 6,266,692 | B1 | 7/2001 | Greenstein |
| 6,321,267 | B1 * | 11/2001 | Donaldson ............. 709/229 |
| 6,442,588 | B1 * | 8/2002 | Clark et al. ............ 709/203 |
| 6,854,014 | B1 * | 2/2005 | Amin et al. ............ 709/227 |
| 2002/0073233 | A1 * | 6/2002 | Gross et al. ............ 709/245 |

OTHER PUBLICATIONS

Scott Hazen Mueller, "What is Spam?", Promote Responsible Net Commerce: Help Stamp out Spam!
John Levine, "Why is Spam bad?", Promote Responsible Net Commerce: Help Stamp out Spam!
John Levine, "Spammers do more than spam", Promote Responsible Net Commerce: Help Stamp out Spam!
"How Does eMail Server Work?", Oracle eMail Server Understanding and Planning Guide, Release 5.1.
Marshall Brain, "What is an E-mail Message?", How E-mail Works, Marshall Brain's How Stuff Works.
Marshall Brain, "Understanding E-mail Clients?", How E-mail Works, Marshall Brain's How Stuff Works.
Marshall Brain, "Understanding a Simple E-mail Server?", How E-mail Works, Marshall Brain's How Stuff Works.
Marshall Brain, "Understanding SMTP?", How E-mail Works, Marshall Brain's How Stuff Works.
Marshall Brain, "Understanding the Real E-mail System?", How E-mail Works, Marshall Brain's How Stuff Works.
Marshall Brain, "Understanding the POP3 Server?", How E-mail Works, Marshall Brain's How Stuff Works.
Marshall Brain, "Understanding Attachments?", How E-mail Works, Marshall Brain's How Stuff Works.

(Continued)

*Primary Examiner*—Gilberto Barrón, Jr.
*Assistant Examiner*—Kristin D. Sandoval
(74) *Attorney, Agent, or Firm*—Thomas, Kayden, Horstemeyer & Risley LLP

(57) ABSTRACT

A method involves blocking unsolicited e-mail being transmitted from a remote server when a roaming customer of the ISP logs onto the Internet through the foreign NAS. The roaming customer first logs onto the ISP through the foreign NAS by providing a user identification (USERID) and password, which are sent to the ISP. The ISP uses the USERID and the password to authenticate the roaming customer as a valid subscriber of the ISP. An IP address is assigned by the foreign NAS to the roaming customer and is dynamically added to a pool of IP addresses used by the mail server. The roaming customer can then log onto the mail server to send and receive email messages. Once the roaming customer terminates the session, the IP address assigned to the roaming customer is removed from the pool of valid IP address that can be used to access the mail server.

27 Claims, 7 Drawing Sheets

OTHER PUBLICATIONS

Marshall Brain, "The Simplicity of E-mail", How E-mail Works, Marshall Brain's How Stuff Works.

Mary Houten-Kemp, "E-Mail Glossary", Everything E-Mail, Internet Mail Services Network, Inc., Ipswich, MA.

John Coleman, "How Does Email Work?", Yale University Library Workstation Support Group, Mar. 18, 1997.

"How does Email Work", IATS Computing Knowledge Base, University of Missouri, Columbia, Aug. 16, 2000.

* cited by examiner

FOREIGN NETWORK SPAM BLOCKER

TECHNICAL FIELD OF THE INVENTION

This invention generally relates to electronic mail ("e-mail") processing, and more specifically relates to blocking SPAM generated through a foreign network access server.

BACKGROUND

Electronic mail, or "e-mail," has become an increasingly popular form of communication over computer networks, such as the Internet. E-mail allows a user (the sender) connected to a network, to send messages almost instantaneously to another user or multiple users (the recipient(s)) connected to the same network. Because the transfer of information is almost in "real time," e-mail has become an indispensable tool for many companies to conduct legitimate business over the Internet. However, some businesses have found that they can advertise their products and services by generating and sending mass, unsolicited e-mails, commonly known in the Internet community as "SPAM." Because these mass e-mails are unsolicited, the recipients consider them a nuisance, because they occupy valuable storage space on the e-mail servers that would otherwise be used to store important e-mails. Furthermore, due to the shear number of unsolicited e-mails that are sent, they can impair or even stop the transmission of legitimate e-mails by overwhelming e-mail servers. For example, a recipient may not be able to receive legitimate e-mails because the storage capacity of the e-mail server that the recipient is connected to may be so overwhelmed with unsolicited e-mails that it may have to reject legitimate incoming e-mail.

Even if the e-mail server is not fully occupied with unsolicited e-mails, the recipient's Internet appliances may be overwhelmed by these junk e-mails. For example, many recipients have Internet-enabled devices such as cellular telephones, personal digital assistants ("PDA"), and pagers that have a limited storage capacity. When a recipient accesses his or her e-mail from one of these devices, the e-mail server downloads the e-mail messages from the recipient's account to these devices. If the recipient's email account contains a large number of SPAM messages, these e-mails can tie up these devices with useless information and deprive the user of valuable resources. The recipient then must waste valuable time deleting these unsolicited e-mails.

E-mail SPAM lists are typically generated by scanning Usenet postings, stealing Internet mailing lists, or searching Internet Web sites for mailing lists. Typically, e-mail SPAM cost the recipient a great deal of money. The recipient must dial-into his or her Internet Service Provider (ISP) to access and download his or her e-mail messages. The recipient therefore, has to pay for the time spent downloading their e-mail messages. If the account is full of unsolicited e-mails, the recipient has to pay to download these messages. Additionally, SPAM costs money for the ISPs to transmit the unsolicited e-mail, which are then passed directly onto the recipients.

One variant of SPAM, known as "foreign SPAM," however, is particularly troublesome. Foreign SPAM occurs when an unsolicited e-mail message is sent to the mail server of an ISP from a user connected to a foreign network access server (NAS). The "spammer" gains access to the mail server when a "roaming" customer of the ISP is connected to their mail server via the foreign NAS. Once the roaming customer logs onto the NAS as a registered user, he or she is provided an IP address by the foreign NAS to use to connect to the mail server at the ISP. Unfortunately, once the connection is made between the foreign NAS and the ISP, the ISP allows any valid IP address at the foreign NAS to be a valid IP address for accessing the mail server. Thus, anybody currently logged onto the foreign NAS has access to the local ISP mail server. This connection allows a "spammer" to use the ISP's mail servers for distribution of large unsolicited e-mails directly to anyone on the Internet with a valid e-mail address. Because every IP address assigned by the foreign NAS is a valid address for sending mail to the local ISP and a new IP address is assigned during the login process, it is difficult to isolate and block the IP address used by the spammer. Even if the local ISP could block the IP address used by the spammer, the spammer could simply log onto the NAS again, this time with a different IP address and continue to SPAM the mail server. The typical way in which to block the unsolicited e-mail messages is to block all incoming messages originating from the foreign NAS, or account. Although this will prevent the distribution of SPAM, it will also unfortunately prevent access to the mail server by the ISP's roaming customer.

Several methods have been devised to block SPAM. One method used to filter SPAM messages uses SPAM probe e-mail addresses that are planted at various sites within ISP network. The mailboxes corresponding to the SPAM probe e-mail addresses are monitored by a controller. Upon receipt of an e-mail message to the SPAM probe addresses, the controller identifies the source of the e-mail message sent to the SPAM probe and generates an alert signal that also contains a filter function. The alert message is sent to all network servers on the network and the filter function is installed on each server to block all e-mail messages sent from the identified source. The filter function automatically blocks all e-mail (both SPAM and non-SPAM messages) originating from the SPAM source. If a registered user was logged onto the SPAM source as a "roaming" user, the roaming user's access to his or her mail server would be blocked once the filter function for that particular SPAM source was installed.

Another method for blocking SPAM messages involves the use of a Simplified Mail Transfer Protocol (SMTP) authentication. SMTP is the main protocol used to transmit mail from an originating address to a destination address. SMTP includes provisions that require an originating user to enter a password to initiate the transmission of an e-mail message. Unfortunately, not all user-based e-mail applications support SMTP. Those e-mail systems that do support SMTP, typically not utilize the password option. Therefore, introduction of this type of security option would cause two undesirable effects: the sender would have to reconfigure his or her user-based e-mail application to accommodate the change in protocol, and the e-mail application would have to be able to support the protocol. If the user's e-mail application was one that did not support the protocol, then the user would have to switch to one that did support the protocol in order to be able to send e-mail messages while roaming.

Although each of these methods are capable of blocking unwanted SPAM messages, neither method is capable of blocking SPAM messages from a foreign NAS while allowing a roaming customer logged on to the foreign NAS to have unfettered access to his or her mail account. Thus there is a need in the art for a method of blocking foreign SPAM messages while allowing a roaming customer to freely access their e-mail account via a foreign NAS.

SUMMARY OF THE INVENTION

The present invention addresses the problems cited above by providing methods of blocking unsolicited e-mail messages, or "SPAM," from being sent to a mail server from a foreign network access server (NAS), by prohibiting any user other than the ISP's customer from sending email messages to the ISP mail server from a remote server IP address. Generally described, a method involves blocking unsolicited e-mail being transmitted to a mail server at an ISP from a foreign NAS when a roaming customer of the ISP logs onto the Internet through the foreign NAS. The roaming customer first logs onto the ISP through the foreign NAS by providing a USERID and password, which are sent to the ISP. The ISP uses the USERID and the password to authenticate the roaming customer as a valid subscriber of the ISP. Once the roaming customer is authenticated, an IP address is assigned by the foreign NAS to the roaming customer and is added to a pool of dynamic IP addresses that may be used to connect to the mail server. Once the roaming customer is assigned an IP address, he or she can then log onto the mail server to send and to receive email messages. Only those IP addresses added to the pool may connect with the mail server located at the ISP. By restricting the access of the mail server to authenticated customers, foreign SPAM from the remote server will be virtually eliminated.

In the preferred embodiment, a method authenticates the roaming user as a registered subscriber to the ISP. Each time the roaming customer attempts to log onto the Internet via a remote server, the roaming customer must inter a USERID and password. The remote server transmits the USERID and password to an authentication server at the roaming customer's ISP. The authentication server compares the USERID and password from the roaming user against a database that contains the USERID and password for each subscriber of the ISP. If the USERID and password from the roaming customer do not match any of the entries in the database, a negative response is generated by the authentication server and transmitted back to the foreign NAS indicating that the roaming customer is not an authenticated user.

If, however, the USERID and password from the roaming customer matches at least one entry in the database at the ISP, the authentication server generates a "positive" response back to the remote server indicating that the roaming customer is an authenticated customer. The remote server then responds back to the authentication server with an IP address (using a "START" record) that is assigned to the roaming user for the duration of the session. A START record is then forwarded and stored at an Authentication, Authorization, and Accounting (AA) database to document the beginning of the Internet session.

On frequent intervals, the ISP's mail access server contacts the AAA database to obtain updates on IP addresses associated with users that have terminated their sessions and on the IP addresses that have been assigned to users starting new sessions. The mail access server then forwards the START record, along with the IP address and RELAY information to the outbound mail server and the mail master database at the ISP to track the roaming user's e-mail access. The mail server then adds the IP address to a list of valid IP addresses that can be used to access the mail server. Conversely, when the mail server receives a "STOP" record, the mail server removes the IP address from the valid list of IP addresses.

When the roaming customer attempts to contact the Outbound mail server, such as the BellSouth® mail server (mail.bellsouth.net) from the foreign NAS, the mail sever checks to see of the IP address is in the active pool of valid IP addresses. If the IP address is not within the pool of valid IP addresses, the outbound mail server denies the request to send e-mail. If however, the IP address is in the pool of valid IP address, then the outbound mail server allows the roaming customer to send the e-mail message.

Once the roaming customer finishes sending e-mail messages, the user may log off the NAS server, at which time the IP address assigned to the roaming customer is deleted from the list of valid IP address that can be used to access the mail server at the ISP.

DETAILED DESCRIPTION OF THE EMBODIMENTS

Figure 1:
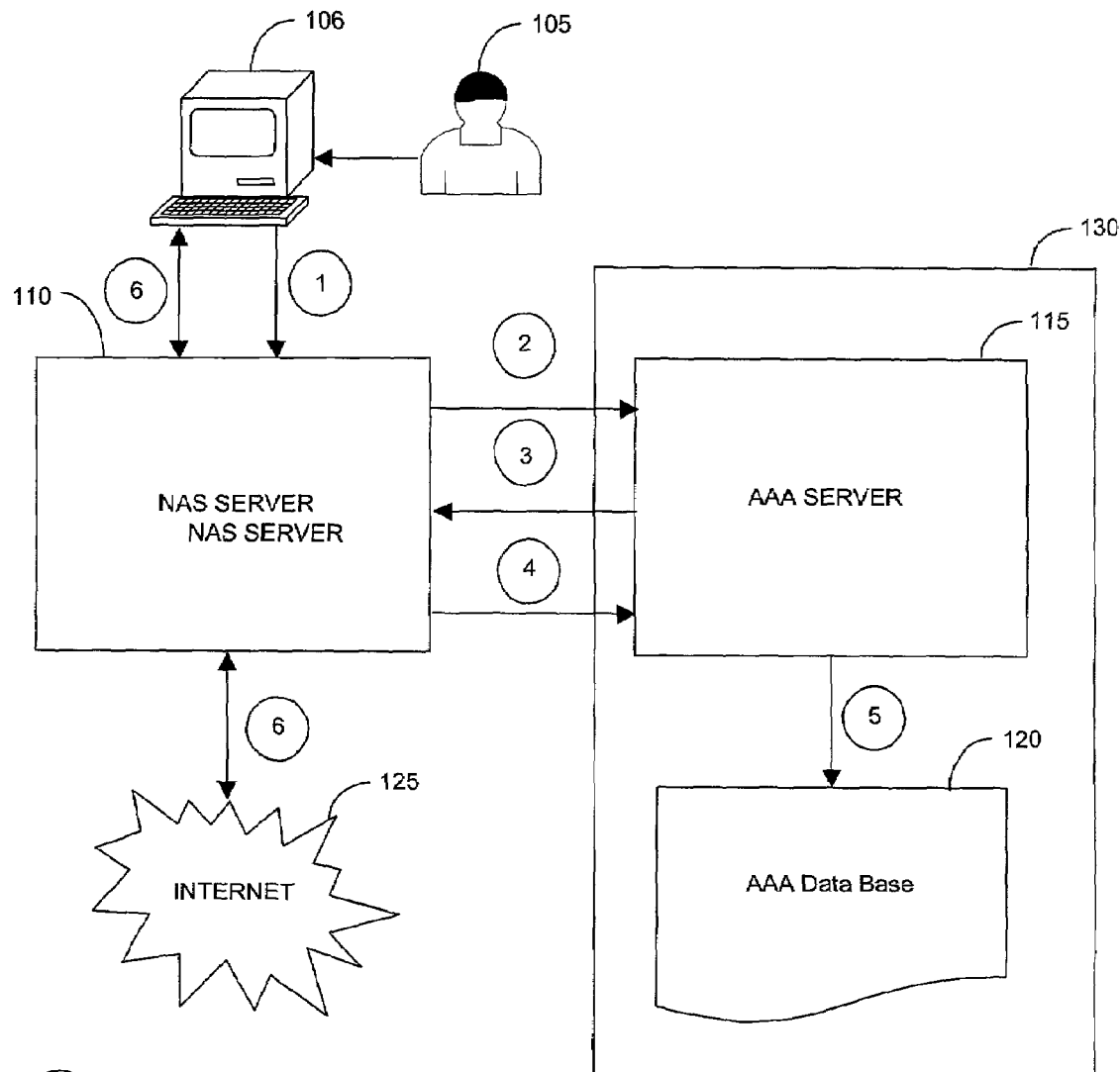
FIG. 1 is a block diagram illustrating an exemplary method of connecting a roaming customer to the Internet through a foreign network access server.

FIG. 1 is a block diagram of an exemplary method to connect a roaming customer to the Internet through a foreign network access server (NAS). The roaming customer 105 accesses the foreign NAS 110 using an Internet device 106 and inputs a user identification code (USERID) and password. Typically, the roaming customer 105 will access the foreign NAS 110 using a personal computer connected via a modem because a personal computer is still the most convenient device to use to connect to the Internet. However, a variety of Internet devices 106, such as web-enabled cellular telephones, personal digital assistants (PDA's), web-enabled pagers, any communication devices, web-enabled data transfer devices, web-enabled entertainment devices, interactive television, mobile radiotelephones, Internet appliances, and the like may be used by the roaming customer 105 to access the foreign NAS 100. Once the user has contacted the foreign NAS 110, the foreign NAS 110 transmits the roaming customer's USERID and password to an Authentication, Authorization and Accounting (AAA) Server 115 located at the roaming customer's home Internet Service Provider (ISP) 130.

Upon receiving the roaming customer's USERID and password, the AAA Server 115 verifies that the roaming customer 105 is a valid subscriber by checking the received USERID and password against a database of registered users for the ISP 130. If the USERID and password match the USERID and password in the database, the AAA Server 115 generates a positive response to notify the foreign NAS 110 that the roaming customer 105 is a registered user at the ISP 130. If the AAA server 115 confirms that the roaming customer 105 is a valid member of the ISP 130, the foreign NAS 110 assigns an IP address to the roaming customer 105. The IP address is associated with the USERID so that only the roaming customer 105 can use the IP address to access the Internet. Associating the USERID with the IP address provides an advantage over existing systems in that only the roaming customer 105 can access the Internet 125 through one particular IP address. No other user connected to the foreign NAS server 110 can use or access the IP address assigned to roaming customer 105. By effectively blocking access to the IP address assigned to the roaming customer 105, other users connected to the foreign NAS server 110 cannot send SPAM using the IP address assigned to the roaming customer 105.

Once the Internet connection is established for the roaming customer 105, the NAS server 110 creates a START record, establishing that the roaming customer 105 has established a connection to the Internet 125. The NAS server 110 then forwards the START record to the AAA Server 115 on the roaming customer's ISP 130. The START record contains several attributes that indicate the identity of the roaming customer 105, the status of the roaming customer's account, and a timestamp of when the connection began. For example, the START record attributes are: the IP address of the NAS Server 110, the NAS Server 110 protocol, the NAS port type, the name of the roaming customer 105, the identification of the station, the account status type, the account authentication, the service type, the account session identification, the frame protocol, the account delay time and the beginning time stamp.

The AAA Server 115 then saves the START record attributes to a database 120 in a format similar to the Terminal Access Controller Access Control System (TACACS). By including the USERID in the TACACS database, the AAA Server 115 can log the usage back to the individual roaming customer 105. Thus, by modifying the database to include the USERID, the ISP 130 is provided the added benefit of better tracking their individual customers Internet usage when they are roaming.

If however, the received USERID and password do not match any USERID and password stored in the database at the AAA Server 115, the AAA Server 115 transmits a negative response back to the NAS Server 110 indicating the roaming customer 105 is not registered with the ISP 130. In this instance, the NAS 110 will not assign an IP address to the roaming customer 105.

As a specific example, suppose a registered BellSouth Internet Service® customer travels outside the range of the BellSouth Internet Service® service area and still wants access to his or her email. The customer can still access his or her email account through a foreign NAS that BellSouth Internet Service® has established a relationship with, such as UUNet®. The BellSouth Internet Service® customer dials up a local UUNet® access line and logs onto their account via the UUNet® NAS. Once the BellSouth Internet Service® customer accesses the UUNet® NAS, he or she must supply their USERID and password. The UUNet® NAS automatically contacts the BellSouth Internet Service® AAA server due to the pre-existing relationship between BellSouth Internet Service® and UUNet®. The UUNet® NAS then transmits the BellSouth Internet Service® customer's USERID and password to be authenticated by the BellSouth Internet Service® AAA Server, which either confirms or rejects the customer's data. If the BellSouth Internet Service® customer data is confirmed, the UUNet® NAS assigns an IP address to the BellSouth Internet Service® customer and adds the IP address to a pool of valid IP addresses reserved by the UUNet® NAS.

Figure 2:
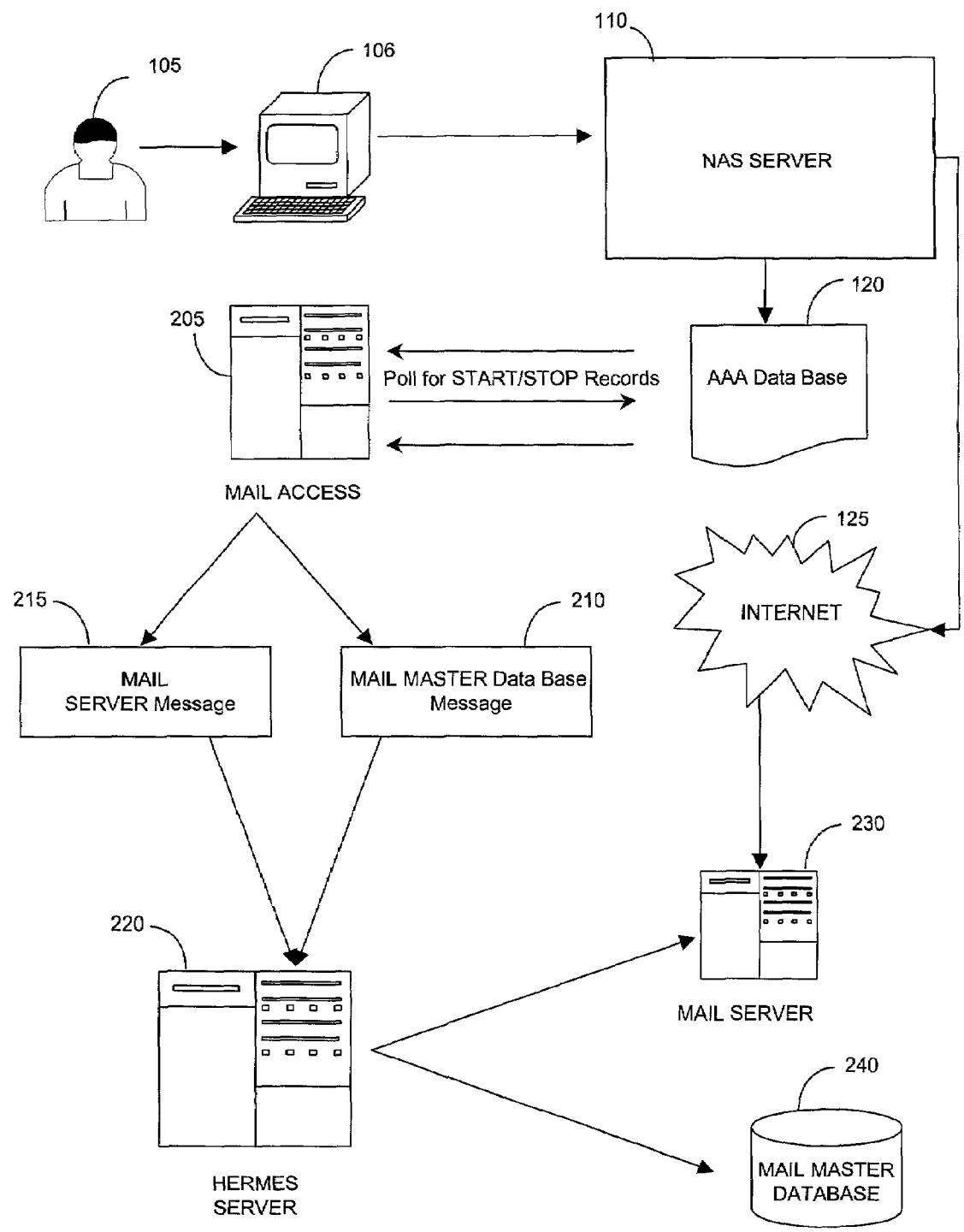
FIG. 2 is a block diagram illustrating an exemplary method of registering a roaming customer's IP address and connecting the roaming customer to an ISP e-mail server.

FIG. 2 is a block diagram illustrating an exemplary method of registering the IP address and connecting a roaming customer 105 to an e-mail server 230 connected to the local ISP. After the roaming customer 105 has successfully logged onto the Internet 125 through an Internet device 106, the Mail Access 205 polls the AAA database 120 for information that was generated at the time the roaming customer 105 logged onto the Internet 125. The Mail Access 205 uses the AAA database 120 to determine whether the entry in the database is a START function, in which case the roaming customer 105 has just logged on, or a STOP function, in which the roaming customer 105 has logged off the NAS 110. In addition to the function type, the AAA database 120 returns the IP address, the RELAY, timestamp (either START or STOP), and the USERID of the roaming customer 105 to the Mail Access Server 205. Next, the Mail Access Server 205 sends a mail access update message 215, which consists of the START function and the IP address to a HERMES Server 220 at the roaming customer's ISP 130. The HERMES Server 220 acts as a main collection point for handling distribution of information to multiple mail servers and databases, as needed. The HERMES Sever 220 then interprets this request to update the pool of valid IP addresses at the mail server 230 by sending an update message 225.

A similar update process is performed on the Mail Master database where a separate update request message 210 is transmitted to the HERMES Server 220 by the Mail Access Server 205. The request message 210 contains the USERID of the roaming customer 105 and timestamp information to track the time the IP address is contained in the pool of valid IP addresses, as well as the IP address. The HERMES Server 220 takes the updated request and forwards a Mail Master message 235 to the Mail Master database 240 to record the change. Therefore, any user without a valid IP address would be denied access the Mail Server 230.

By associating IP addresses to the USERID, access to the Mail Server 230 at the roaming customer's ISP 130 is restricted to those with valid USERID's. Specifically, associating the IP Address with the USERID effectively blocks another user on the foreign NAS 10 from gaining access to the Mail Server 230 on the ISP 130, thereby eliminating unsolicited e-mails, or SPAM, from being sent from the foreign NAS. This method allows other roaming customers to maintain access to the Mail Server 230 while blocking the foreign SPAM e-mail.

The Mail Master database 240 can be used for tracking the roaming customer's account. In addition to saving the information for tracking purposes, if for any reason, a user on the foreign NAS 110 is able to send foreign SPAM e-mail over a registered IP address, the MMASTER database 240 will have a record of which roaming customer was active, so that the ISP 130 can identify which roaming customer 105 account the SPAM e-mails originated from. Additionally, if the foreign SPAM e-mails continually originate with a specific customer when they are roaming, the ISP 130, through the AAA Server 115, may deny that specific customer access to the system whenever he of she is roaming outside the ISP 130 home area of coverage. The ISP's mail system is now ready to validate a request from a roaming customer 105 to send e-mail messages through their mail server 230.

When an SMTP request is received by the mail server 230 from a roaming customer's Internet device 106, the mail server 230 checks the IP address that originated the e-mail request. If the IP address of the roaming customer 105 that originated the request is in the pool of valid IP addresses, the mail server 230 processes the e-mail request. If, however, the IP address of the roaming customer 105 that originated the request is not contained in the pool of valid IP addresses, the e-mail request is denied and deleted. An advantage of deleting the e-mail request is that the "spammer" believes that he or she has been successful in accessing the mail server 230, even though their access has been denied. In this way, the "spammer" will typically not attempt any other means to send the SPAM e-mail.

Figure 3:
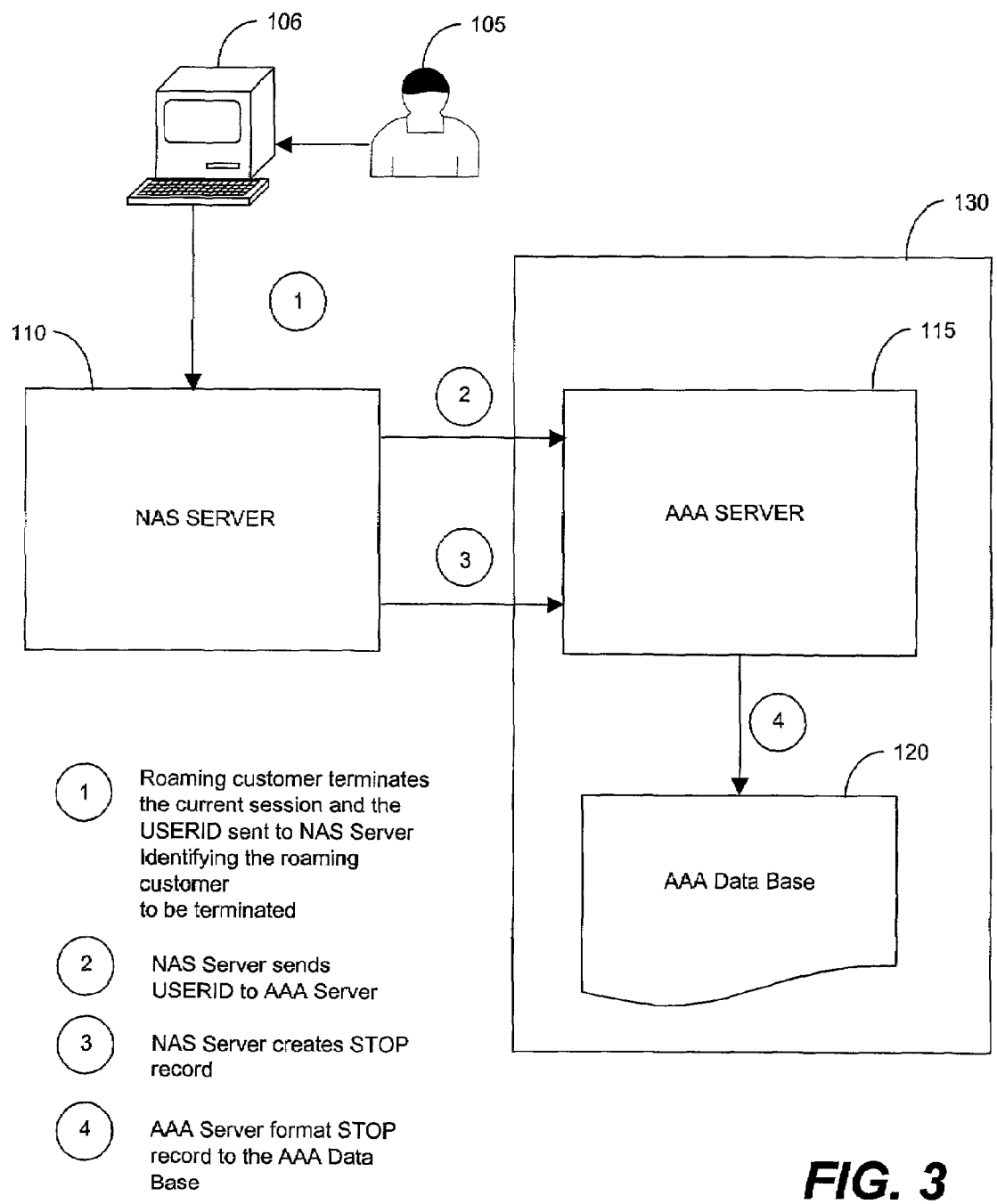
FIG. 3 is a block diagram illustrating an exemplary method of disconnecting a roaming customer from a foreign network access server.

FIG. 3 is a block diagram illustrating an exemplary method of disconnecting a roaming customer 105 from the foreign NAS 110. To begin logging off the foreign NAS 110, the roaming customer 105 first generates a termination signal to log off the foreign NAS 110. The termination signal may be a signal to log off the system, powering off of the Internet device 106 by the roaming customer 105, closing the browser window by the roaming customer, and the like. Upon receiving the termination signal, the NAS 110 takes the IP address assigned to the roaming customer 105 and removes it from the list of valid IP address that are in service at the NAS 110. Next, the foreign NAS 110 creates a STOP record and forwards it to the AAA Server 115. Generally, the STOP record contains the following attributes: IP address, the NAS protocol, the roaming customer's USERID, the called station ID, the calling station ID, the account status type, the account authentication, the service type, the account session identification number, the framed protocol, the framed IP address, the account termination cause, the account input octets, the account output octets, the account input packets, the account output packets, the account session time, the account delay time, and the end timestamp. The AAA Server 115 uses the STOP record and the START record to keep an accurate account of the billing for each user based on the USERID. The STOP record is propagated through the ISP's mail system in the same manner as the START record, when the Mail Access Server 205 polls the AAA database 120, thereby updating the Mail Server's 230 pool of allowed IP addresses. Future attempts to send mail from this IP address are disregarded by the Mail Server 230 until a new user validates with that IP address.

Another method of disconnect may occur when a time out is initiated in the Mail Master database 240. A time out is initiated if the roaming customer 105 exceeds the maximum amount of time allowed for roaming connectivity, or a STOP record is never received from the NAS 110. In these instances, the customer record is removed from the Mail Master database 240 and the IP address is removed from the pool of valid IP addresses.

Figure 4:
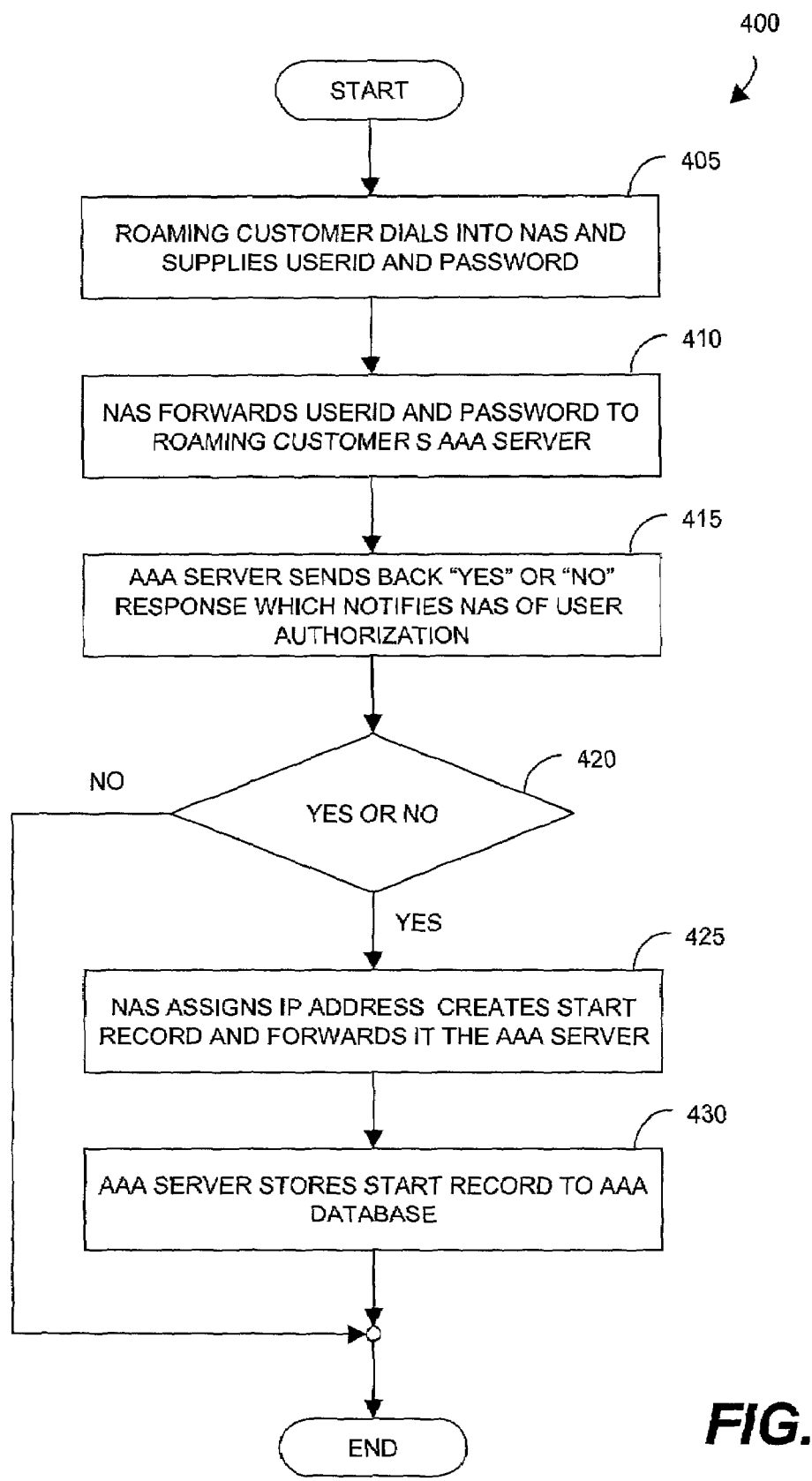
FIG. 4 is a logic flow diagram of an exemplary method to connect a roaming customer to a foreign network access server.

FIG. 4 is a logic flow diagram illustrating the method of connecting a roaming Internet customer to a "foreign" ISP. The method 400 begins at 405, in which the roaming customer 105 logs onto the foreign NAS 110. Typically the roaming customer 105 logs onto the foreign NAS 110 by connecting their Internet device 106, normally a personal computer, to the foreign NAS 110 through the telephone lines via a modem. The roaming customer 105 then dials foreign NAS 110 and supplies their USERID and password. Although for purposes of this illustration, the Internet device 106 illustrated is a personal computer, those skilled in the art will appreciate that other Internet devices 106, such as Web-enabled cellular telephones, PDA's, pagers, and the like may be used without altering the scope of the invention. Furthermore, those skilled in the art will appreciate that other networks and methods of connecting the roaming customer 105 to the foreign NAS 110, such as a local area network (LAN), a wide area network (WAN), satellite transmission, cable transmission, and the like may be used to connect the roaming customer's Internet device to the NAS. Next, at 410, the foreign NAS 110 forwards the roaming customer's USERID and password to the customer's local AAA server 115. At 415, the roaming customer's AAA server 115 generates a reply signal. The reply signal will either be a "YES" signal signifying that the roaming customer 105 is authorized to connect to the AAA server 115 or a "NO" no signal, which signifies that the roaming customer 105 is not authorized to connect to the AAA server 115. At 420, a determination is made at the AAA server 115 whether the roaming customer 105 is authorized to connect to the AAA server 115. If the determination is made that the roaming customer 105 is authorized, the "YES" branch is followed to 425, in which the local NAS 110 assigns an IP address for the roaming customer 105 to use and forwards it as part of a START record to the AAA Server 115. The START record includes START attributes that include the NAS IP address, the protocol used by the NAS, the port type of the NAS, the roaming customer's name, the called station ID, the calling station ID, the account status type, the account authentication code generated by the AAA server 115, the service type, the account session ID, the frame protocol, the account delay time, and a time stamp. Although this list of START attributes includes most of the attributes needed to keep an accurate record of the roaming customer's session, the list is not meant to exhaustive and those skilled in the art will appreciate that other attributes may be added to the START log by the individual service providers. At 430, the AAA server 115 stores the START record to the AAA database 120.

Returning to 420, if a determination is made that the roaming customer 105 is not an authorized customer of the AAA Server 115, then the AAA server 115 generates and forwards a "NO" response to the foreign NAS 115 and the "NO" branch is followed to the "END," where the connection is terminated.

Figure 5A:
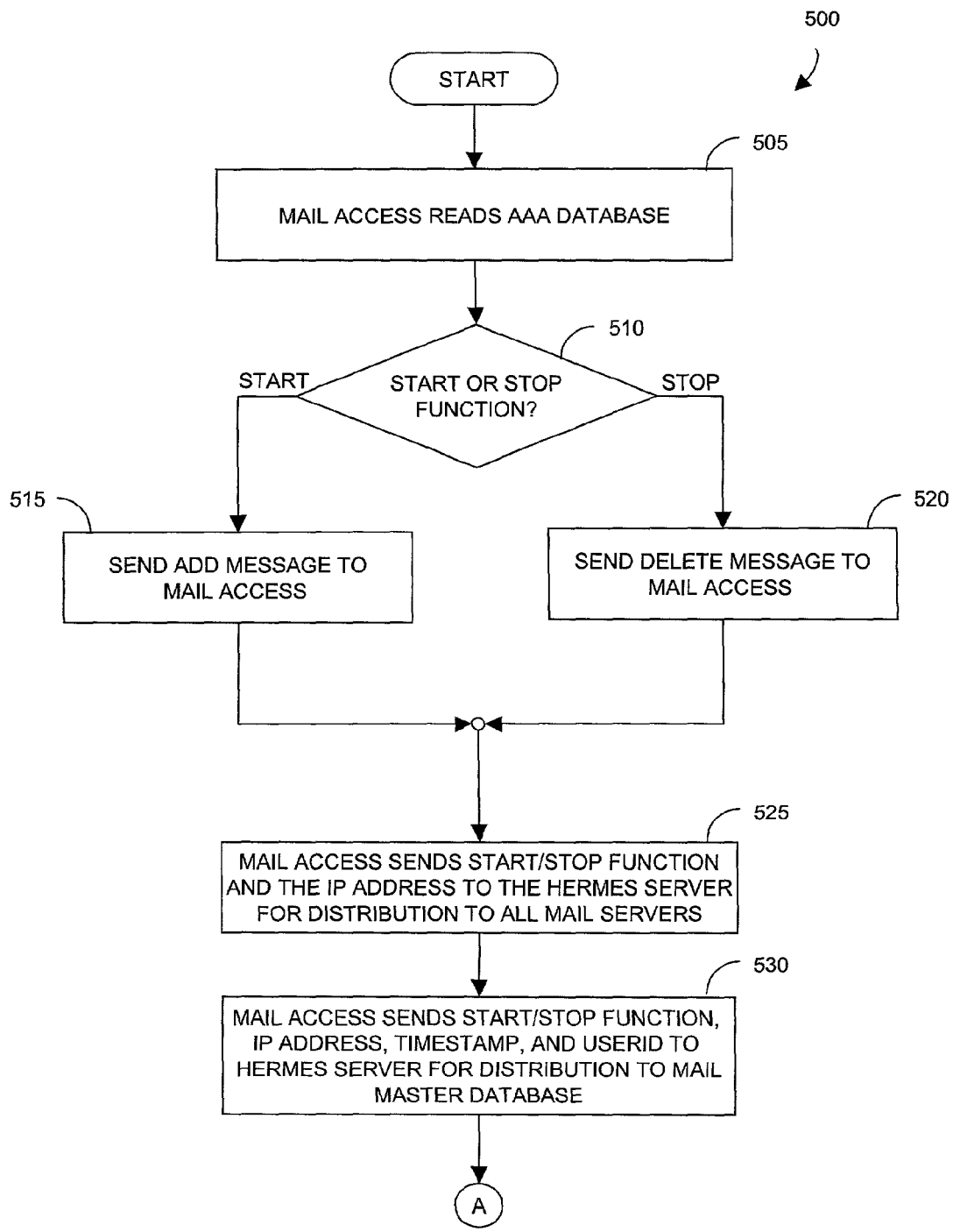
FIGS. 5A and 5B, collectively known as FIG. 5, is a logic flow diagram of an exemplary method of registering an IP address and connecting a roaming customer to an electronic mail server.
Figure 5B:
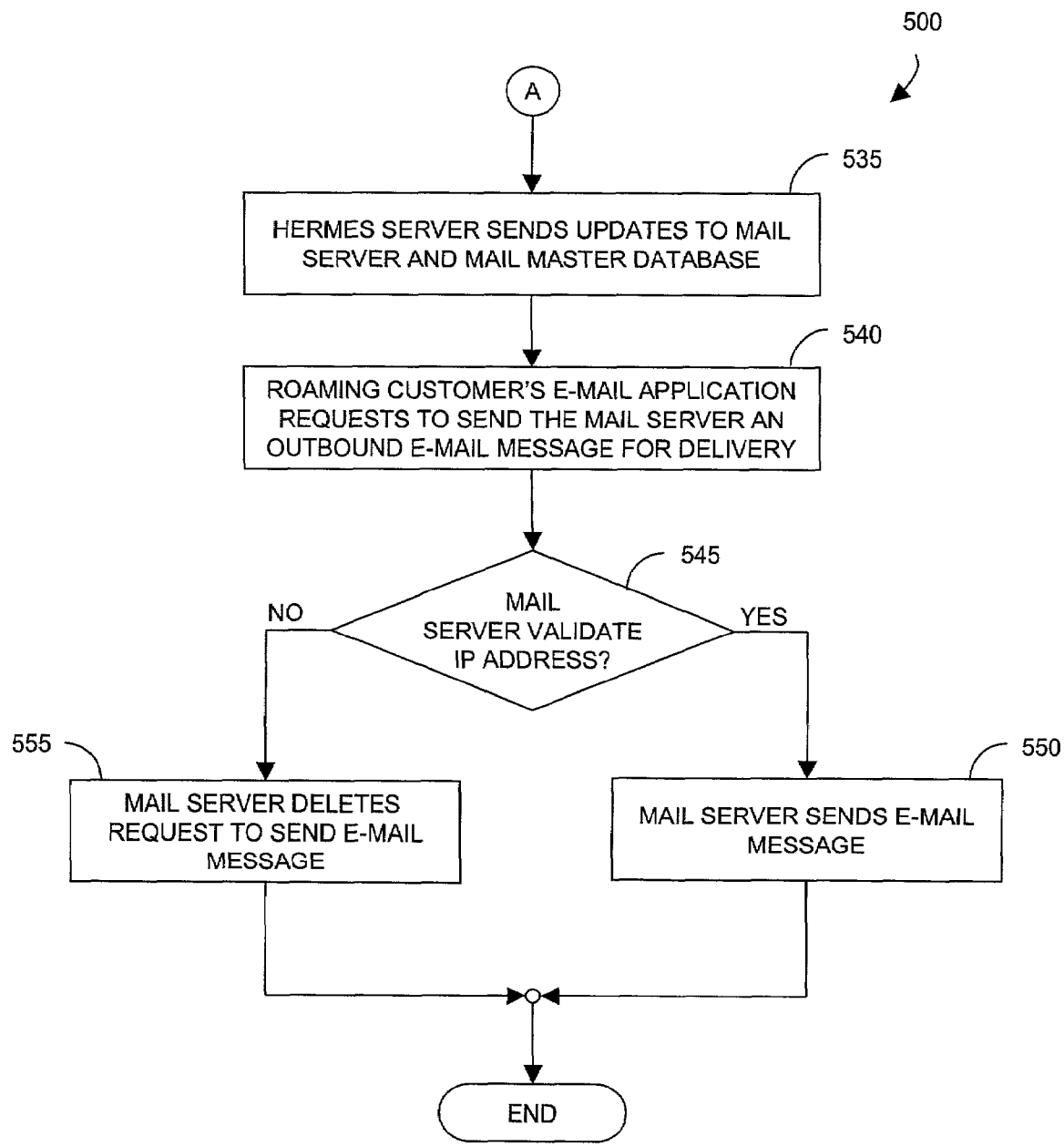

FIG. 5 is a logic flow diagram illustrating an exemplary routine 500 for registering and connecting a roaming customer 105 to an electronic mail server 230 (FIG. 2) through the foreign NAS 110. Routine 500 begins at 505, in which the Mail Access Server 205 reads the AAA database 120 that contains the START and STOP parameters. Once all the parameters are read, a determination is made at 510 whether the AAA database 120 contains either START or STOP parameters. If the AAA database 120 contains START parameters, routine 500 proceeds along the "START" branch to 515, where the AAA database 120 generates and sends a START response to the Mail Access Server 205. If however, the AAA database 120 contains a STOP parameter, routine 500 proceed along the "STOP" branch to 525, in which the AAA database 120 generates a STOP response and transmits it to the Mail Access Server 205.

At 525, the Mail Access Server 205 forwards the START or STOP response from the AAA database 120 along with the IP address assigned to the roaming customer 105 and the RELAY in a message 215 to the HERMES Sever 210 for distribution to the mail server 230. At 530, the Mail Access Server 205 forwards the START or STOP response, the IP address, RELAY, timestamp and USERID information extracted from the AAA database 120 to the HERMES Sever 240 for routing to the Mail Master Database 240. It should be noted that although 525 is illustrated occurring subsequent to 530, those skilled in the art will appreciate that 525 and 530 may occurs simultaneously to decrease the time needed to process the access request. At 535, the HERMES Server 220 forwards updates to the Mail Master Database 240 and the Mail Servers 230.

At 540, the roaming customer's 105 e-mail application makes a request to send the outbound e-mail message to the ISP's mail server 230 for delivery to the recipient. At 545, a determination is made after receiving the request whether the roaming customer's IP address is valid. If the roaming customer's IP address is valid, the "YES" branch is followed to 550, where the mail server 230 forwards the e-mail message to the recipient. If, however, the determination is made that the IP address is invalid, the "NO" branch is followed to 555 where the mail server 230 deletes the request.

Figure 6:
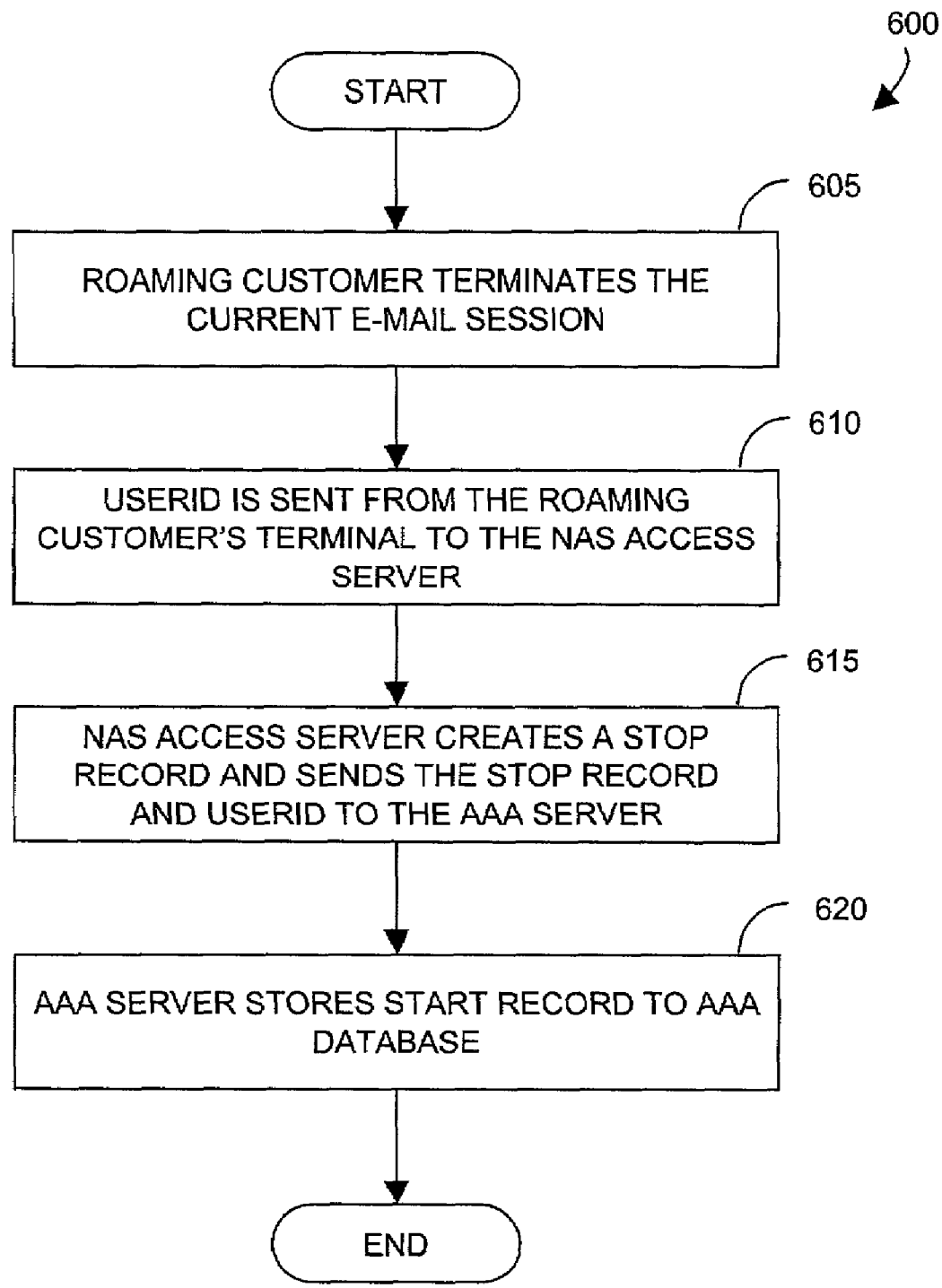
FIG. 6 is a logic flow diagram of an exemplary method of disconnecting the roaming customer from a foreign network access server.

FIG. 6 is a logic flow diagram illustrating an exemplary routine 600 of disconnecting the roaming customer 105 from a foreign NAS 110. Routine 600 begins at 605, in which the roaming customer 105 generates a signal to terminate the session. Typically, the roaming customer 105 can generate the termination signal by simply logging off the system or terminating the power to the Internet device 106. At 610, the foreign NAS 110 transmits the USERID assigned to the roaming customer 105 to the AAA Server 115 at the roaming customer's ISP 130. The AAA Server 115 uses the USERID to identify the roaming customer 105 to be terminated. Next, at 615, the foreign NAS 110 generates a STOP record and transmits it to the AAA Server 115 at the roaming customer's ISP 130. Typically the STOP record includes the NAS IP address, the NAS communications protocol, the NAS port type, the USERID, the called station ID, the account status type, the account authentication code, the type of service, the account session identification, the framed protocol, the account termination cause, the account input octets, the account output octets, the account session time, the account delay time, and the timestamp of when the session was terminated. The AAA Server 115 takes this information and formats it into a TACACS format and stores the formatted data in the AAA database 120 to be used in generating billing information. Finally, the IP address assigned to the roaming customer 105 is removed from the list of valid IP address that can be used to access the Mail Server 230 via the foreign NAS 110.

The present invention thus provides a method of prohibiting any user connected to a foreign NAS 110, to transmit unsolicited e-mail messages, known as foreign SPAM, to a Mail Server 230 at a local ISP 130 when a registered customer of the ISP is connected as a roaming customer to the foreign NAS 110.

It should be understood that the foregoing pertains only to the preferred embodiments of the present invention, and that numerous changes may be made to the embodiments described herein without departing from the spirit and scope of the invention.

We claim:

1. A method for blocking unsolicited e-mail transmitted to an e-mail server at an Internet Service Provider (ISP), the method comprising:
   receiving a user identification (USERID) and a password associated with a customer;
   retrieving a plurality of data associated with the customer based on the USERID and password;
   authenticating the customer using the retrieved plurality of data;
   dynamically adding an IP address assigned to the customer to a plurality of valid IP addresses associated with the ISP;
   receiving outgoing SMTP traffic from the customer;
   in response to receiving the outgoing SMTP traffic, determining, at the e-mail server, the e-mail server being configured to receive and maintain at least one e-mail, whether the customer is associated with a valid IP address; and
   in response to determining that the customer is associated with a valid IP address, logging the customer onto the e-mail server using the IP address and the plurality of data used to authenticate the customer, and sending the outgoing SMTP traffic to a recipient, wherein the outgoing SMTP traffic is sent to the recipient only in response to determining that the customer is associated with a valid IP address.

2. The method of claim 1, wherein authenticating the customer comprises:
   receiving the USERID and password associated with the customer to an authentication ISP;
   comparing the USERID and password against at least one USERID and password associated with at least one registered user of the ISP;
   generating a negative response if the USERID and password associated with the customer does not match a USERID and password associated with at least one registered customer;
   generating a positive response if the USERID and password associated with the customer matches a USERID and password associated with at least one registered customer; and
   receiving a START record, the START record indicating the beginning of the customer's access to the e-mail server.

3. The method of claim 1, wherein the plurality of IP addresses are used only by customers registered with the ISP to access the Internet through a remote server.

4. The method of claim 1, wherein dynamically adding the customer's IP address to a pool of valid IP address comprises:
   reading a START record, a timestamp, a RELAY from the database; and
   forwarding a START record, USERID, password, and IP address for adding the IP address to the pool of valid IP addresses.

5. The method of claim 1, wherein logging the customer onto the e-mail server comprises:
   initiating an SMTP request to send e-mail from an e-mail application server; and
   validating the IP address of the customer against the pool of valid IP addresses.

6. The method of claim 1, further comprising logging off the customer from a remote server.

7. The method of claim 1, further comprising assigning an IP address to the customer.

8. The method of claim 6, wherein logging off the customer, comprises:
   receiving a termination signal by the customer;
   transmitting the customer's USERID to the remote server to identify the customer to be logged off; and
   receiving a STOP record, wherein the STOP record is operable to identify the customer.

9. The method of claim 8, wherein receiving the STOP record further comprises determining whether the customer has sent any unauthorized email messages.

10. The method of claim 8, further comprising transferring the USERID to an authentication server on the ISP.

11. A method of preventing unsolicited e-mails from being transmitted via a mail server associated with the Internet Service Provider (ISP) of a customer, the method comprising:
receiving a user identification (USERID) and password, wherein the USERID and password are associated with the customer;
authenticating the customer as a registered user of the ISP;
generating a positive response if the customer is a registered user of the ISP;
receiving a START record indicating that the customer is being logged onto a Network Access Server (NAS);
writing the START record to a database;
receiving outgoing SMTP traffic from the customer for delivery to a recipient;
in response to receiving the SMTP traffic determining, at the mail server, the mail server being configured to receive and maintain at least one e-mail message, whether an IP address assigned to the customer is valid; and
in response to determining that the IP address assigned to the customer is valid, forwarding the outgoing SMTP traffic to the recipient.

12. The method of claim 11, further comprising generating a negative response if the customer is not a registered user at the ISP.

13. The method of claim 11, further comprising transmitting the USERID and password from the Internet device to the NAS.

14. The method of claim 11, further comprising assigning a local IP address to the customer, the local IP address being selected from a plurality of IP addresses at the-NAS.

15. The method of claim 12, wherein generating a negative response comprises denying the customer access to the Internet through the NAS.

16. The method of claim 11, wherein the START record comprises an IP address, a protocol, a port type, a User name, a called station ID, a calling station ID, an account status type, an account authentication, a service type, an account session ID, a framed protocol, an account delay time, and a start timestamp.

17. The method of claim 11, wherein the database contains data organized according to a Terminal Access Controller Access Control System (TACACS) format.

18. The method of claim 15, further comprising not allowing the customer to authenticate.

19. The method of claim 16, wherein the START record comprises a NAS IP address, a NAS protocol, a NAS port type, a User name, a called station ID, a calling station ID, an account status type, an account authentication, a service type, an account authentication, a service type, an account session ID, a framed protocol, an account delay time, and a start timestamp.

20. The method of claim 17, wherein the database has been modified to include a USERID field.

21. A method of logging on a customer of an Internet Service provider (ISP) onto a mail server while preventing the unauthorized distribution of SPAM messages via the mail server, the method comprising:
authenticating that the customer is a registered customer of the ISP;
storing a data log in a database, the data log comprising a plurality of attributes to track the customer's usage of the network connection;
receiving outgoing SMTP traffic from the customer for a recipient;
in response to receiving the SMTP traffic, determining, at the mail server, the mail server being configured to receive and maintain at least one e-mail message, whether an IP address assigned to the customer is valid; and
in response to determining that the IP address assigned to the customer is valid, sending the outgoing SMTP to the recipient.

22. The method of claim 21, further comprising removing the IP address from a list of at least one valid IP address upon receiving a command to log off the customer from mail server.

23. The method of claim 21, wherein authenticating the customer comprises:
receiving a user identification (USERID) and a password associated with the customer;
comparing the USERID and password from the customer to a list of at least one USERID and password associated with at least one registered customer of the ISP;
transmitting a positive response if the USERID and password associated with the customer matches a USERID and password associated with a registered customer from the list; and
transmitting a negative response if the USERID and password does not match a USERID and password associated with at least one registered customer of the ISP from the list of at least one USERID and password stored at the authentication server.

24. The method of claim 21, further comprising, creating a data log associated with the customer, wherein the data log comprises a START identifier, the USERID and password associated with the customer, the IP address assigned to the customer, a RELAY to the mail server from a Network Access Server (NAS), and a timestamp indicating the starting time the customer logged onto the mail server.

25. The method of claim 21, further comprising transferring the data log to a mail access server at the ISP.

26. The method of claim 21, further comprising assigning an IP address to the customer to access the mail server.

27. The method of claim 26, further comprising adding the IP address assigned to the customer to a list of a valid IP address that are allowed to access the mail server on the ISP.

* * * * *